United States Patent
Djuphammar et al.

(10) Patent No.: US 6,879,580 B1
(45) Date of Patent: Apr. 12, 2005

(54) COMBINED CDMA MULTI-SERVICE CARRIER AND TDMA/CDMA PACKET CARRIER

(75) Inventors: Hakan O. Djuphammar, San Diego, CA (US); Mohamad I. Nasser, San Diego, CA (US); Henrik Basilier, Kensington, CA (US)

(73) Assignee: Telefonaktiebolaget LM Ericsson (SE)

( * ) Notice: Subject to any disclaimer, the term of this patent is extended or adjusted under 35 U.S.C. 154(b) by 0 days.

(21) Appl. No.: 09/474,056

(22) Filed: Dec. 28, 1999

Related U.S. Application Data

(60) Provisional application No. 60/169,195, filed on Dec. 6, 1999, and provisional application No. 60/167,838, filed on Nov. 29, 1999.

(51) Int. Cl.[7] .............................................. H04L 12/66
(52) U.S. Cl. ....................................... 370/352; 370/324
(58) Field of Search ................................ 370/350, 352, 370/353, 355, 356, 459

(56) References Cited

U.S. PATENT DOCUMENTS

| | | | |
|---|---|---|---|
| 5,115,233 A | 5/1992 | Zdunek et al. ......... 340/825.44 |
| 5,533,019 A | 7/1996 | Jayapalan ................... 370/60.1 |
| 6,374,112 B1 * | 4/2002 | Widegren et al. ........... 455/452 |
| 6,385,179 B1 * | 5/2002 | Malcolm et al. ............. 370/329 |
| 6,389,008 B1 * | 5/2002 | Lupien et al. ............... 370/352 |
| 6,418,148 B1 * | 7/2002 | Kumar et al. ................ 370/468 |

FOREIGN PATENT DOCUMENTS

| | | | |
|---|---|---|---|
| WO | WO 95/25407 | 9/1995 | ............ H04Q/7/22 |
| WO | WO 99/16266 | 1/1999 | ............ H04Q/7/22 |
| WO | WO 99/11032 | 4/1999 | ............ H04L/12/56 |

* cited by examiner

*Primary Examiner*—Man U. Phan
*Assistant Examiner*—Toan Nguyen
(74) *Attorney, Agent, or Firm*—Coats & Bennett, P.L.L.C.

(57) ABSTRACT

The present invention provides systems and methods for coordinating calls within hybrid cells that support both an all services carrier and a best-efforts carrier, wherein the all services carrier supports real-time and non-real-time services and the best efforts carrier supports only non-real-time services. In one embodiment of the invention, the all services carrier is a 1×RTT carrier and the best-efforts carrier is an HDR carrier. Calls may be placed on either carrier and transferred between the carriers as circumstances dictate. In addition, the present invention provides systems and methods to dynamically determine the most appropriate carrier for a given call.

20 Claims, 10 Drawing Sheets

3.6  INCOMING DATA CALL IN IDLE STATE

```
MS is on ASC
MS has IP address                    200
PDCN notifies BSC of call                    205
BSC notifies MSC of call via A- interface
MSC checks COS —— 210
If automatic switch over is ON       215
        If is High data rate is ON
                Synch with PDC
                Switch MS to PDC
                Connect MS to PDCN → Call is ON   Call Complete
                MS disconnect data call
                Synch back with ASC       220
        Else
                Use the low rate data of 1xRTT
                MS can use simultaneous data and voice
Else —— 225
        Send an SMS with incoming data call (Y/N)
        If MS accepts call
                Send SMS message. Would you like to use high or low data
                If high data rate is selected.    230
                        Synch with PDC
                        Switch MS to PDC
                        Connect MS to PDCN → Call is ON
                        MS disconnect data call
                        Synch with ASC
                Else                              235
                        Use the low rate data of 1xRTT
                        MS can use simultaneous data and voice
        Else
                                      240
                Data call is not accepted
```

*Fig. 3*

3.7  OUTGOING DATA CALL IN IDLE STATE

MS is on ASC
MS has IP address
MS initiates a data call
If automatic switch over is ON — 250
    If is High data rate is ON — 255
        Synch with PDC
        Switch MS to PDC
        Connect MS to PDCN → Call is ON
        MS disconnect data call
        Synch back with ASC
    Else — 260
        Use the low rate data of 1xRTT
        MS can use simultaneous data and voice
Else — 270
    Send SMS message, Would you like to use high or low data
    If high data rate is selected — 275
        Synch with PDC
        Switch MS to PDC
        Connect MS to PDCN → Call is ON
        MS disconnect data call
        Synch with ASC
    Else — 280
        Use the low rate data of 1xRTT
        MS can use simultaneous data and voice

Fig. 4

3.8            INCOMING DATA CALL WHILE ON VOICE

MS is on ASC
MS has IP address
PDCN notifies BSC of call ⟵ 300
BSC notifies MSC of call via A- interface
MSC checks COS
If automatic switch over is ON ⟵ 310
    Check Fundamental Data rate feature
      If is High data rate is ON ⟵ 315
        Place caller on hold in the MSC
        Inform voice call of situation (RCAN)
        Call is still active in the BSC and MSC (Billing is ON)
            Synch with PDC
            Switch MS to PDC
            Connect MS to PDCN → Call is ON
            MS has control to switch back to voice call
            MS disconnect data call
            Synch with ASC
            Bring back voice call
    Else ⟵ 320
        Use the low rate data of 1xRTT
        MS can use simultaneous data and voice
Else ⟵ 325
    Send an SMS with incoming data call (Y/N) ⟵ 330
    If MS accepts call
        Send SMS message, Would you like to use high or low data
        If high data rate is selected
            Place caller on hold in the MSC
            Inform voice call of situation (RCAN)
            Call is still active in the BSC
            and MSC-Billing On
                Synch with PDC
                Switch MS to PDC
                Connect MS to PDCN → Call is ON
                MS has control to switch back to voice call
                MS disconnect data call
                Synch with ASC
                Bring back voice call
        Else ⟵ 335
            Use the low rate data of 1xRTT
            MS can use simultaneous data and voice
    Else
        Data call is not accepted ⟵ 340

*Fig. 5*

3.9  OUTGOING DATA CALL WHILE ON VOICE

```
MS is on ASC
MS has IP address          350
MS initiates a data call
If automatic switch over is ON           355
    Check Fundamental Data rate feature
    If is High data rate is ON
        Place caller on hold in the MSC
        Inform voice call of situation (RCAN)
        Call is still active in the BSC and MSC (Billing is ON)
        Synch with PDC
            Switch MS to PDC
            Connect MS to PDCN → Call is ON
            MS disconnect data call
     360    Synch back with ASC
            Bring back voice call
    Else
        365  Use the low rate data of 1xRTT
             MS can use simultaneous data and voice
Else
    Send SMS message, Would you like to use high or low data
    If high data rate is selected
        Place caller on hold in the MSC
        Inform voice call of situation (RCAN)
        Call is still active in the BSC and MSC-Billing On
        Synch with PDC
        Switch MS to PDC
        Connect MS to PDCN → Call is ON
        MS disconnect data call
    370  Synch with ASC
         Bring back voice call
    Else
        Use the low rate data of 1xRTT
        MS can use simultaneous data and voice
```

3.12      INCOMING VOICE CALL WHILE ON DATA (HYBRID)

```
MS is on the PDC carrier
MSC get a voice call
Check COS for Voice Automatic Switch over
If feature is on block
    Block the call ————— 380
    Give RCAN
Else        ——390
If feature is ON
    Check Supplemental Data rate feature
    If the High data rate is ON  ————— 400
            Cannot accept the call
            Caller is informed with RCAN
        Else
                          ————— 410
            Synch with ASC
            Continue the data call on lower data
            Accept the voice call
            Treat call as 1XRTT
Else    ——420
    Send SMS to user, voice call is coming, accept call ?
    If caller accepts call
                    Send SMS to user , "High data rate is no longer available"
            Synch with ASC
            Continue the data call on lower data
            Accept the voice call
            Treat call as 1XRTT
    Else                    ——430
            Call is rejected
            Caller is informed with RCAN
```

Fig. 8      OUTGOING VOICE CALL WHILE ON DATA (HYBRID)

```
MS is on the PDC carrier
MS initiates a voice call                                  ——440
Send SMS to user " Are you sure, you will loose your high data rate ?"
If the user accepts ———445
        Synch with ASC
        Continue the data call on lower data
        Make the voice call
        Treat call as 1XRTT call
Else
        Call is not placed ——450
```

3.1 POWER ON 3.4     INCOMING VOICE CALL IN THE IDLE STATE

MS is on PDC  
MSC gets the call     470  
MSC checks the COS for Automatic switch for voice call  
If feature is ON  
    MSC instructs the MS to search for the ASC  
    MS finds the ASC and informs the MSC  
    MS switches to ASC  
    MSC sends that call to the MS → call is ON  
    Call is complete (Release)  
480    MSC instructs the MS to synch back with the PDC  
    MS is synched with PDC  
Else  
    MSC sends an SMS to the user telling him about the call  
    If MS accepts the call  
        MSC instructs the MS to search for the ASC  
        MS finds the ASC and informs the MSC  
        MS switches to ASC  
        MSC sends that call to the MS → call is ON  
        Call is complete (Release)  
490    MSC instructs the MS to synch back with the PDC  
        MS is synched with PDC  
    Else  
        Call is rejected

Fig. 10

COMBINED CDMA MULTI-SERVICE CARRIER AND TDMA/CDMA PACKET CARRIER

CROSS-REFERENCE TO RELATED APPLICATIONS

This application claims priority to U.S. Provisional Ser. No. 60/169,195 filed on Dec. 6, 1999 and U.S. Provisional Ser. No. 60/167,838 filed on. Nov. 29, 1999, the contents of both of which are hereby incorporated by reference.

FIELD OF THE INVENTION

The present invention relates to wireless communication networks. More particularly, the present invention pertains to systems and methods using a hybrid time division multiple access (TDMA), code division multiple access (CDMA) packet only carrier as a packet data booster for a CDMA multi-service carrier.

BACKGROUND OF THE INVENTION

The third generation (or "3G") of wireless communication services promises to bring unity to a fractured worldwide cellular market. 3G systems will permit seamless travel not presently available in the splintered U.S. mobile telephone service. In addition, 3G systems promise a wide array of high-speed broadband data transmission and processing, including video, on-board navigation, and Internet access.

One wireless standard designed to support 3G services is cdma2000™, defined by the ITU in its IMT-2000 vision. Phase one of the cdma2000 standard effort, known as "1×RTT" (i.e., Radio Transmission Technology), has already been completed and published by the Telecommunications Industry Association (TIA). 1×RTT refers to cdma2000 implementation within existing spectrum allocations for cdmaOne—1.25 MHz carriers. The technical term is derived from N=1 (i.e., use of the same 1.25 MHz carrier as in cdmaOne) and the "1×" means one time 1.25 MHz. 1×RTT is backward compatible with cdmaONE networks, but offers twice the voice capacity, data rates of up to 144 kbps, and overall quality improvements.

Also employing a 1.25 MHz channel is the High Data Rate (HDR) technology. HDR is RF compatible with cdmaOne and 1sRTT systems and permits side-by-side deployment of transmitters and antennas in existing CDMA towers. Unlike 1×RTT, which is optimized for circuit switched services, HDR is spectrally optimized for best effort packet data transmission. HDR delivers very high-speed CDMA wireless Internet access at peak data rates greater than 1.8 Megabits per second. Notably, unlike 1×RTT, the control and data channel in an HDR carrier are time multiplexed.

Because of its high speed Internet access, it is preferable to conduct data calls over an HDR carrier, rather than on a 1×RTT carrier. Nevertheless, because HDR is packet based, it does not accommodate real time applications very well. Thus, a user of an HDR carrier who wishes to place a voice call would need to use a carrier such as 1×RTT.

Thus, there is a need in the art for a hybrid wireless system, which allows calls to be transferred between a 1×RTT carrier and an HDR carrier, as circumstances dictate.

SUMMARY OF THE INVENTION

The present invention provides systems and methods for coordinating calls within hybrid cells that support both an all services carrier and a best-efforts carrier, wherein the all services carrier supports real-time and non-real-time services and the best efforts carrier supports only non-real-time services. In one embodiment of the invention, the all services carrier is a 1×RTT carrier and the best-efforts carrier is an HDR carrier. (Note that there are always two carriers for both 1×RTT and HDR: one for the forward link and one for the reverse link. As used herein, "carrier" will collectively refer to both the forward and reverse link carriers.)

In accordance with one aspect of the invention, a mobile station synchronizes to the 1×RTT carrier when in an idle state. If a user wishes to place or receive a voice call or a data call at a low data rate during the idle state, established 1×RTT call flows are followed. If, however, a user wishes to place or receive a data call at the high data rate, the mobile station is first synchronized with the HDR carrier. In one embodiment, a user may set a high data rate switch that, when ON, indicates data calls are to be carried over the HDR carrier. If the high data rate switch is OFF, the data calls are to be carried over the 1×RTT carrier.

In accordance with another aspect of the invention, a mobile station synchronizes to the HDR carrier when in an idle state. If a user wishes to place or receive a data call at the high data rate, established HDR call flows are followed. If, however, a user wishes to place or receive a voice call or a data call at the low rate, the mobile station is first synchronized with the 1×RTT carrier. In one embodiment, a user may set a voice call block switch that, when ON, indicates the user does not wish to receive voice calls.

Regardless of which carrier a mobile station synchronizes with during an idle state, the mobile station will be on the HDR carrier during a high data rate data call. During such a data call, it is possible an application requiring the real time capabilities of the 1×RTT carrier will arise. For example, the user may want to use a "Voice over IP" application, while using the HDR carrier for Internet access. In accordance with another aspect of the invention, systems and methods are provided to detect the presence of such an application during a high data rate call and to transfer the call to the 1×RTT carrier. In one embodiment, either the network or the mobile station could examine the transmitted packets to determine whether the high data rate call should be transferred to the 1×RTT carrier. In another embodiment, the application requiring the real time capabilities would use an Application Programming Interface to request that high data rate call be transferred to the 1×RTT carrier.

As will be apparent to those skilled in the art, other and further aspects and advantages of the present invention will appear hereinafter.

BRIEF DESCRIPTION OF THE DRAWINGS

Preferred embodiments of the present invention are illustrated by way of example, and not by way of limitation, in the figures of the accompanying drawings, in which like reference numerals refer to like components, and in which:

FIG. 3 is a call flow diagram for the mobile station of FIG. 3, receiving an incoming data call in the idle state.

FIG. 4 is a call flow diagram for the mobile station of FIG. 3, placing an outgoing data call in the idle state.

FIG. 5 is a call flow diagram for the mobile station of FIG. 3, receiving an incoming data call during an active voice call.

FIG. 6 is a call flow diagram for the mobile station of FIG. 3, placing an outgoing data call during an active voice call.

FIG. 7 is a call flow diagram for the mobile station of FIG. 3, receiving an incoming voice call during an active HDR data call.

FIG. 8 is a call flow diagram for the mobile station of FIG. 3, placing an outgoing voice call during an active HDR data call.

FIG. 10 is a call flow for the mobile station of FIG. 9, receiving a incoming voice call during an idle state.

DETAILED DESCRIPTION OF THE PREFERRED EMBODIMENTS

Figure 1:
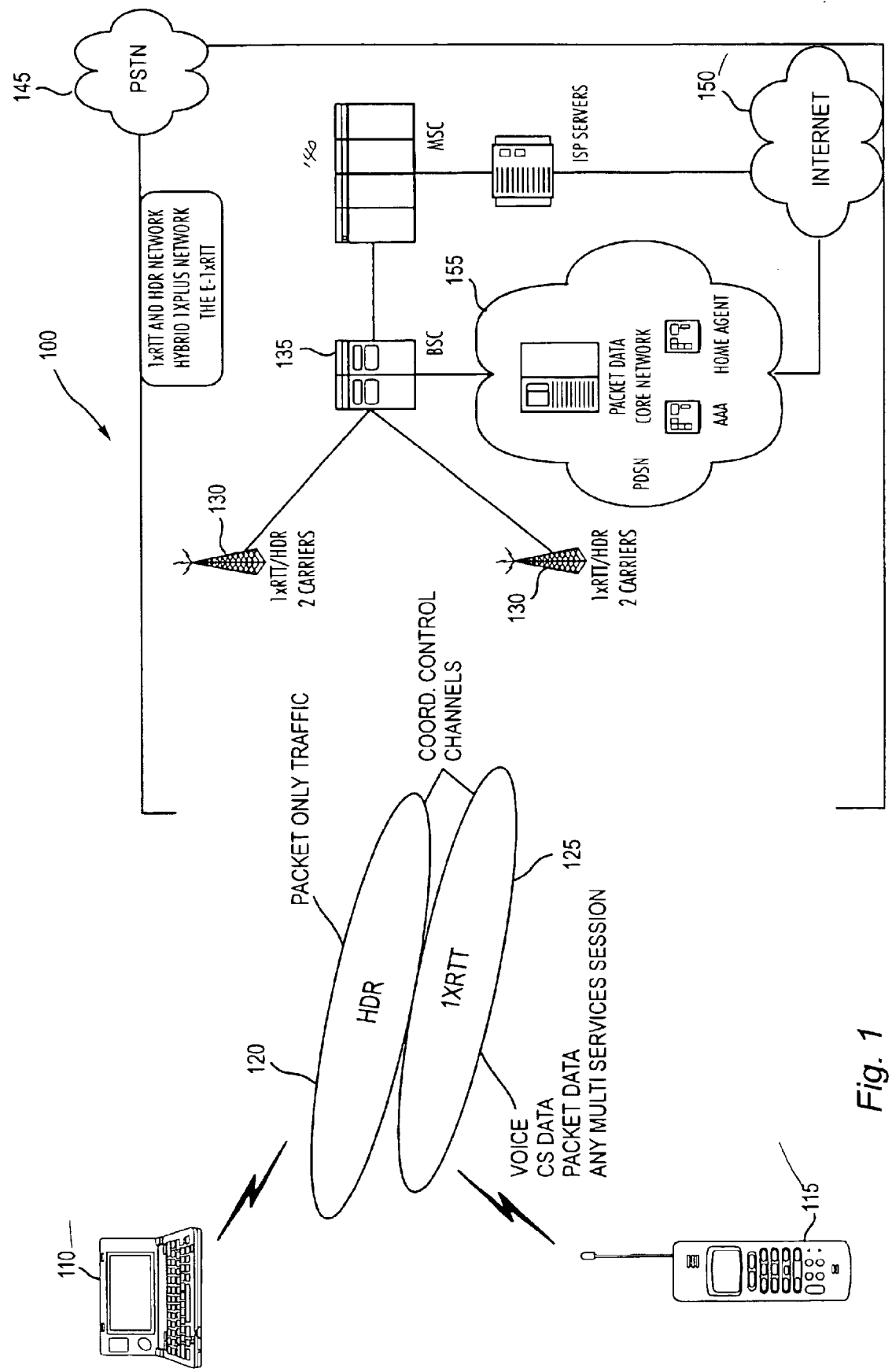
FIG. 1 is a block diagram of a hybrid 1×RTT/HDR network, according to one embodiment of the invention.

FIG. 1 illustrates a preferred hybrid 1xRTT/HDR network 100. Users at a mobile station such as a laptop computer 110 having a wireless transceiver or a handset 115 may communicate over either an HDR carrier 120 or a 1xRTT carrier 125. The 1xRTT carrier 125 may carry voice, packet data, or other multi services. The HDR carrier 120 is a carrier used only for the transmission of non-real-time packet data. Transmitters 130 under the control of a base station controller 125 carry both the HDR and the 1xRTT carriers 120 and 125. A mobile switching center 140 connects a public switched telephone network (PSTN) 145 with a base station controller 135.

Voice traffic to and from the PSTN 145 would be carried over the 1xRTT carrier 125. In contrast, data flowing to and from the Internet 150 may be carried by either the 1xRTT carrier 125 or the HDR carrier 120. Packet data from the Internet 150 destined for the HDR carrier 120 may directly enter the base station controller 135 via a packet data core network 155. Data from the Internet 150 destined for the 1xRTT carrier 125 will instead travel via an ISP server 160 to the mobile switching center 140.

The hybrid 1xRTT/HDR network 100 will share a common set of broadcast channels, common mobility handling, and coordinated control channels. Because both the 1xRTT carrier and the HDR carrier are available, a handset at power ON must choose which carrier the handset will "camp" on, and use as the default carrier when in an idle state.

Towards this end, the present invention has two main embodiments: one in which 1xRTT is the default carrier, and one in which HDR is the default carrier. Regardless of which carrier the mobile station is defaulted to, the mobile station will synchronize (or "synch up") with the remaining carrier at certain times. The mobile switching center will always know which carrier a mobile station is defaulting to and will instruct the mobile station when to synchronize with the remaining carrier. This synchronization process is handled by both the base station controller and the mobile station. The base station controller sends the necessary information, e.g. time, access channel code, traffic channel code, etc., to the mobile station, which uses this information to synchronize with the remaining carrier.

1. 1xRTT Default Carrier

Figure 2:
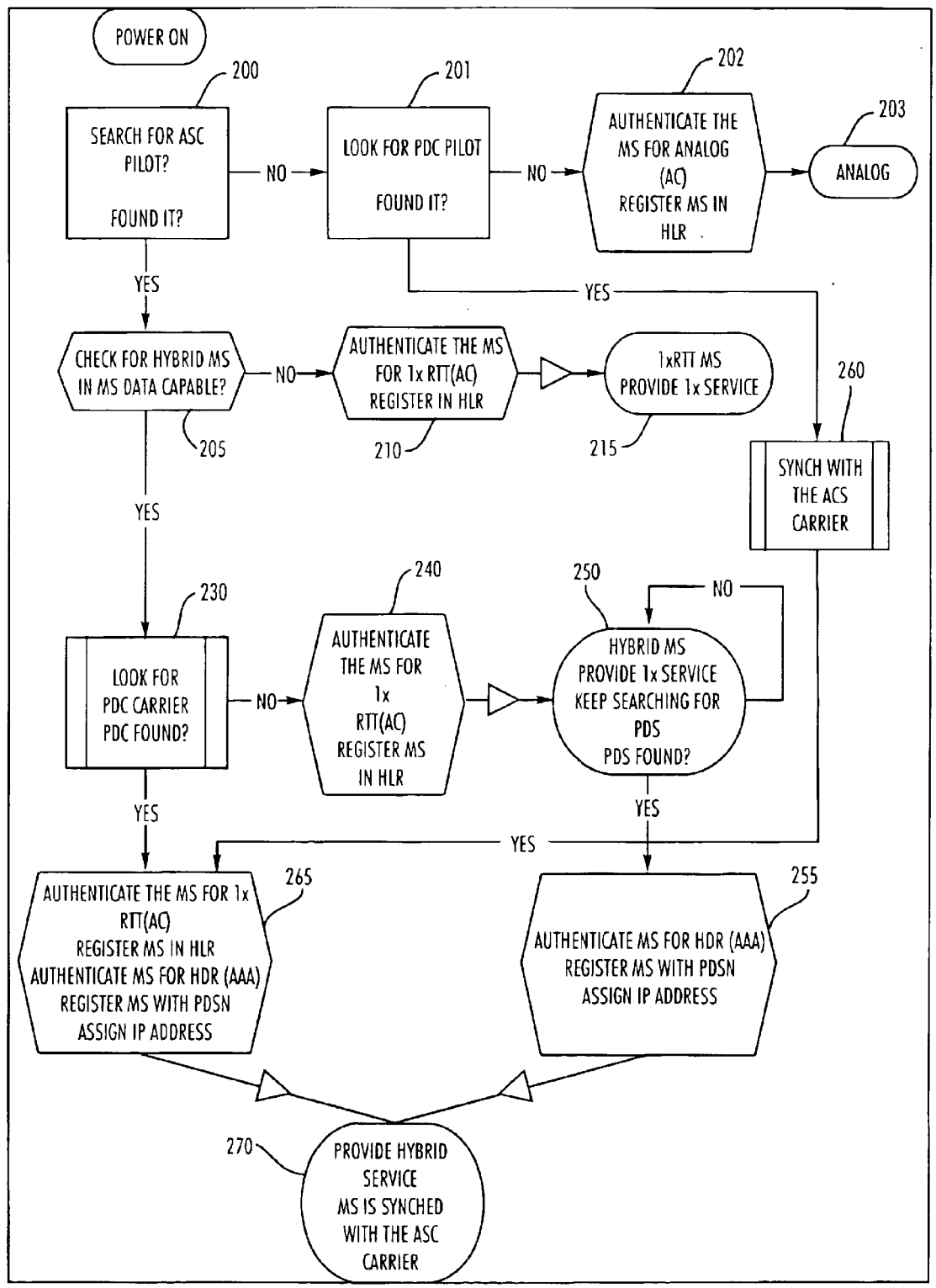
FIG. 2 is a flow chart for the power ON procedure in a mobile station that defaults to the 1×RTT carrier, according to one embodiment of the invention.

FIG. 2 depicts a call flow for a "power ON" in which 1xRTT is the default carrier.

At power ON, the mobile station (MS) searches for the 1xRTT pilot, denoted as the All Services Carrier (ASC), at step 200. If the pilot is unavailable, the MS will search for the HDR pilot, denoted as the Packet Data Carrier (PDC), at step 201. Should neither pilot be available, the MS is authenticated for analog service and registered in the Home Location Register (HLR), or the mobile switching center, at step 202, so that analog service may begin at step 203.

Assuming the 1xRTT pilot is available at step 200, the MS checks to see if it is capable of hybrid operation at step 205. If it is not, the MS is authenticated for standard 1xRTT service and registered in the Home Location Register (HLR) of the mobile switching center at step 210, so that standard 1xRTT service may begin at step 225.

Preferably, the MS is capable of hybrid operation, wherein the MS searches for the HDR carrier at step 230. Note that in an early implementation of the invention, the coverage area of the HDR carriers may be smaller than the area coveraged by the 1xRTT carriers. Thus, it is possible for the MS to not find the HDR carrier, whereupon the authentication and registration step 210 is repeated at step 240. The MS will continue to search for the HDR carrier at step 250. Should the MS travel into a hybrid cell and begin to receive the HDR carrier, the MS will be authenticated for HDR, registered in the Packet Data Switched Network (PDSN), and assigned an IP address at step 255.

Note that if the MS has found the HDR pilot at step 201, the MS will synchronize with the 1xRTT carrier at step 260. After "synching" with the carrier, the MS is authenticated, registered in the HLR, registered in the PDSN, and assigned an IP address at step 265. Note that this same step is performed should the HDR carrier be located in step 230. Finally, the MS is synchronized with the 1xRTT carrier at step 270.

After power ON is completed, the MS is defaulted to the 1xRTT carrier. Thus, should the mobile station be idle and either place or receive a voice call, normal incoming or outgoing voice call 1xRTT procedures are followed. Note that this is not the case should the MS be idle and an incoming data call be received, e.g., an incoming e-mail or content being pushed from the Internet. Similarly, if the user were on a 1xRTT data call, a voice call may be placed or received following established 1xRTT procedures.

In FIG. 3, the call flow for an incoming data call while the MS is an idle state is illustrated. Because the MS is on the 1xRTT carrier and has an IP address, the PDCN notifies the base station controller of the data call at step 200. The base station controller notifies the mobile switching center of the call over the A-interface, so that the mobile switching center may check the Class of Service (COS) at steps 205 and 210. In one embodiment, the mobile station automatically receives incoming data calls through the use of an "automatic switch." Such a switch could be configured from either hardware, or software, or their combination. Similarly, the mobile station could also be provided with a data rate switch that indicates whether the phone would automatically receive the data call on the HDR carrier (high data rate), or on the 1xRTT carrier (low data rate).

Should the automatic switch be ON, the MS checks whether the High data rate switch is ON at step 215. Assuming the high data rate switch is ON, the MS will synchronize with the HDR carrier and switch over to the HDR carrier. The MS may then be connected to the PDCN and receive its data call. After completing the data call, the MS must be resynchronized with the 1xRTT carrier. If the high data rate switch is OFF, the call flow resumes at step 220. Because the MS is already on the 1×RTT carrier, it may directly receive the data call. Moreover, a user of the MS would have the option to simultaneously receive/place a voice call if the high data rate switch is OFF.

If the automatic switch is OFF, the call flow continues at step 225. Here, a user of the MS would not automatically receive the data call. Instead, the MS would receive a Short Message Service (SMS) message, asking the user whether the incoming data call should be accepted. If the user accepts the call, the MS would receive a second SMS message, asking the user whether the data call should use the high or low data rate. If "high data rate" is selected, the call flow continues at step 230. This call flow is as described with respect to step 215—i.e., the MS will synchronize with the HDR carrier, connect to the PDCN and receive the data call. Upon completion of the call, the MS must resynchronize with the 1×RTT carrier.

Should the user select to receive the data call on the low data rate channel (1×RTT), the call flow proceeds at step 235. Because the MS is already on the 1×RTT carrier, it may directly receive the data call in such a case. Moreover, a user of the MS would have the option to simultaneously receive/ place a voice call if the high data rate switch is OFF. Should the user not accept the data call at step 225, the call flow proceeds at step 240. In such a case, the MS remains on the 1×RTT carrier and no data is received.

Turning to FIG. 4, the converse of the call flow of FIG. 3 is illustrated. In this situation, the MS is in an idle state and the user places an outgoing data call, e.g., by sending an e-mail or accessing a web page. Should the automatic switch be ON, the call flow proceeds at step 250. The MS would then check whether the user has set to the high data rate switch ON. If the high data rate switch is ON, the call flow proceeds at step 255. Assuming the high data rate switch is ON, the MS will synchronize with the HDR carrier and switch over to the HDR carrier. The MS may then be connected to the PDCN and place its outgoing data call. After completing the data call, the MS must be resynchronized with the 1×RTT carrier.

If the high data rate switch is OFF, the call flow proceeds at step 260. Because the MS is already on the 1×RTT carrier, it may directly place the outgoing data call. Moreover, the user would have the option to simultaneously receive/place a voice call if the high data rate switch is OFF.

If the automatic switch is OFF, the call flow continues at step 270. Here, the user would not automatically place the data call. Instead, the MS would receive an SMS message, asking the user whether the outgoing data call should be placed on the HDR carrier (high data rate) or on the 1×RTT carrier (low data rate). Should the user select the high data rate at step 275, the MS will synchronize with the HDR carrier, switch over to and use the HDR carrier for transfer of data, connect to the PDCN, and place the outgoing data call. Upon completion of the call, the MS must resynchronize with the 1×RTT carrier. Alternatively, should the user select to place the data call on the low data rate channel (1×RTT), the call flow proceeds at step 280. Because the MS is already on the 1×RTT carrier, it may directly place the data call. Moreover, the user would also have the option to simultaneously receive/place a voice call.

FIGS. 3 and 4 illustrate the call flows for placing and receiving a data call while the mobile station is in an idle state. However, the mobile station could also receive or place a data call during an active voice call.

Turning to FIG. 5, the call flow for receiving an incoming data call during an active voice call is illustrated. At step 300, the Packet Data Core Network (PDCN) notifies the base station controller of the incoming data call. Subsequently, the base station controller notifies the mobile switching center of the data call via the A-interface so that the mobile switching can check the Class of Service for the MS. The MS checks whether the automatic switch is ON at step 310. Should the automatic switch be ON, the high data rate switch is checked at step 315. If the high data rate switch is ON at step 315, the active voice call must be placed on hold—i.e., since HDR is incompatible with the real-time requirements of an active voice call. Thus, mobile switching center places the caller on hold and informs the caller with a recorded announcement (RCAN). The MS then synchronizes with the HDR carrier and switch over to the HDR carrier. The MS may then be connected to the PDCN and receive the incoming data call. After completing the data call, the MS must be resynchronized with the 1×RTT carrier to reconnect the voice call. If the high data rate is OFF (step 320), the MS may simultaneously receive the incoming data call on the 1×RTT carrier it was already on.

The call flow when the automatic switch is OFF proceeds at step 325. The user is notified of the incoming data call with an SMS message and asked whether the call should be received. Should the user accept the call, an additional SMS message inquires whether the user wishes to receive the call at the high or low data rate at step 330. Note that if the user wishes to receive the data call at the high data rate, the active voice call must be placed on hold. Thus, the caller is placed on hold and informed of the situation with a recorded announcement. The MS will then synchronize with the HDR carrier and switch over to the HDR carrier. The MS may then be connected to the PDCN and receive its incoming data call. After completing or disconnecting the data call, the MS must be resynchronized with the 1×RTT carrier to bring back the voice call. If the high data rate is not selected (step 335), the MS may simultaneously receive the incoming data call on the 1×RTT carrier it was already on.

Finally, should the automatic switch be OFF at step 310, the incoming data call is not accepted at step 340.

The converse of the call flows of FIG. 5 is illustrated in FIG. 6.

Here, the user wishes to place an outgoing data call during an active voice call. The MS checks whether the automatic switch is ON at step 350. If the automatic switch is ON, the high data rate switch is checked at step 355. If the high data rate switch is ON at step 355, the active voice call must be placed on hold. Thus, mobile switching center places the caller on hold and informs the caller with a recorded announcement (RCAN). The MS will then synchronize with the HDR carrier and switch over to the HDR carrier. The MS may then be connected to the PDCN and place its outgoing data call, e.g., to sent e-mail or browse web content.

After completing the data call, the MS must be resynchronized with the 1×RTT carrier to bring back the voice call. If the high data rate is OFF (step 360), the MS may simultaneously place the outgoing data call on the 1×RTT carrier it was already on.

The call flow when the automatic switch is OFF proceeds at step 365. The user is asked with a SMS message whether the call should be placed at the high or low data rate. Note that if the user wishes to receive the data call at the high data rate, the active voice call must be placed on hold. Thus, the caller is placed on hold and informed of the situation with a recorded announcement. The MS will then synchronize with the HDR carrier and switch over to the HDR carrier. The MS may then be connected to the PDCN and place its outgoing data call. After completing or disconnecting the data call, the MS must be resynchronized with the 1×RTT carrier to bring back the voice call. If the high data rate is not selected (step 370), the MS may simultaneously place the outgoing data call on the 1×RTT carrier it was already on.

Just as a mobile station may receive a data call during an active voice call, it may also receive an incoming voice call during an active high data rate (HDR) data call. Turning to FIG. 7, the call flow for such a situation is illustrated. In one embodiment of the invention, the Class of Service may include a Voice Call Block. The Voice Call Block feature would be selected by the user to indicate whether voice calls should be automatically blocked during an active HDR data call. Because the HDR data call would have to be switched to the 1×RTT carrier at a lower data rate to receive the incoming voice call, the user may decide to keep the activate the Voice Call Block to preserve a high data rate. In such a situation, illustrated at step 380, the call is blocked and the caller is informed of the block with a recorded announcement. Should the Automatic Voice Switch be ON, indicating the user wishes to automatically receive voice calls, the call flow proceeds at step 390. Here, the high data rate switch is checked. Should the high data rate switch be ON at step 400, the call is blocked and the call is informed of the block with a recorded announcement. If, however, the high data rate switch is OFF at step 410, the MS is synchronized with the 1×RTT carrier so that the data call may switch over to the 1×RTT carrier and continue at the low data rate. The MS may then accept the incoming voice call on the 1×RTT carrier.

Should the Automatic Voice Switch be OFF, the call flow proceeds at step 420. In this case, the user receives an SMS message asking whether the incoming voice call should be received. If the user accepts the call, an additional SMS message is sent to inform the user that use of the high data rate is no longer available. The MS must then synchronize with the 1×RTT carrier and continue the data call on the 1×RTT carrier. The incoming voice call may then be accepted over the 1×RTT carrier also. If the user does not accept the incoming call, the call is rejected at step 430 and the caller informed with a recorded announcement.

The converse of the call flow of FIG. 7 is illustrated in FIG. 8.

In this instance, the user places an outgoing voice call during an active high data rate (HDR) data call. Should the user initiate a voice call, the user is informed with an SMS message that the high data rate will be lost at step 440. If the user accepts the loss of the high data rate, the call flow proceeds at step 445. In this case, the MS must synchronize with the 1×RTT carrier so that the data call may continue on the 1×RTT carrier. The user may then place the voice call on the 1×RTT carrier. If the user does not wish to lose the high data rate, the voice call is not placed at step 450.

In accordance with this general aspect of the present invention, coordinated switching of the MS between the 1×RTT carrier and the HDR carrier within a given cell is accomplished. However, it is possible that some cells may only support 1×RTT. Thus, the invention also provides handoff procedures at the boundaries between "hybrid" and "1×RTT-only" cells.

For example, a mobile station may be within a hybrid cell and travel to a cell supporting only 1×RTT. If the mobile station was idle, it can simply handoff to the 1×RTT carrier in the 1×RTT cell. If, however, a high data rate call was active in the hybrid cell, then the data call must be switched over to the lower data rate 1×RTT carrier as the mobile station travels into the 1×RTT cell. Thus, the MS would have to synchronize with the 1×RTT carrier and switch the data call to the 1×RTT carrier, or the call would be lost in the 1×RTT cell. Preferably, an SMS message would notify the user that the call is continuing at the lower data rate. Note that an active voice call could have been on hold with the active HDR call. In this case, the voice call would become active as the data call switched over to the low data rate 1×RTT carrier.

Similarly, if a low data rate call (on the 1×RTT carrier) was active in the hybrid cell, the MS must still synchronize with the 1×RTT carrier in the 1×RTT cell. However, the data call would continue at the same data rate. Also at the low data rate within the hybrid cell would be an active voice call. In such a case, 1×RTT handoff procedures would be followed as the MS traveled into the 1×RTT cell, allowing the voice call to stay active.

Conversely, a mobile station could be located within a 1×RTT cell, and then travel into a hybrid cell supporting both 1×RTT and HDR. If no calls were active, the MS need merely synchronize with the 1×RTT carrier within the hybrid cell. If a data call was active in the 1×RTT cell, the data call may be switched to the higher data rate HDR carrier as the mobile station travels into the hybrid cell. Preferably, the user would be notified with an SMS message that the data call has been switched to the higher data rate. If either a voice call or a simultaneous voice and data call was active in the 1×RTT cell, the call could not be switched to the HDR carrier as the mobile station travels into the hybrid cell.

2. HDR as the Default Carrier

Figure 9:
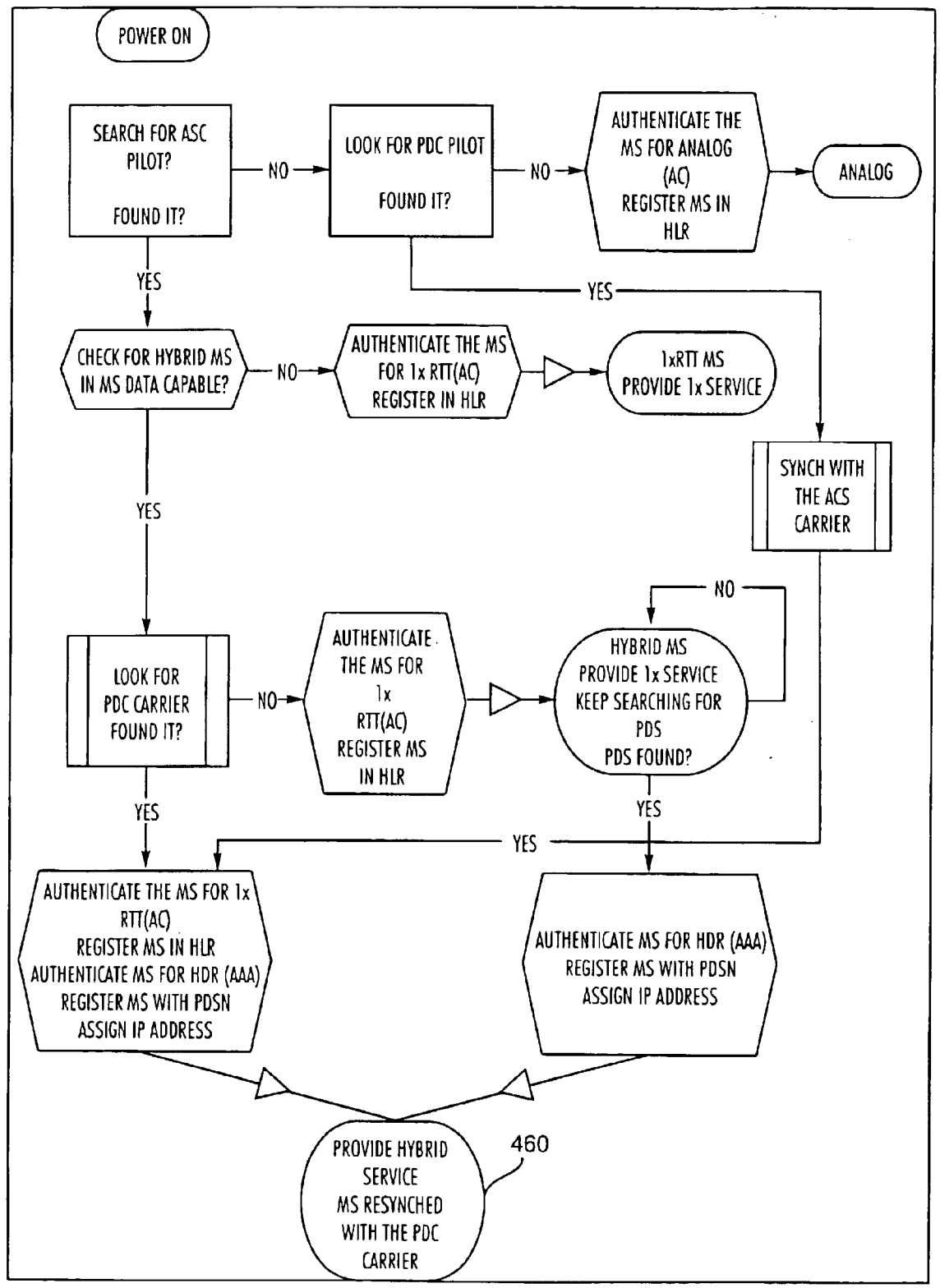
FIG. 9 is a flowchart illustrating the power ON procedure for a mobile station that defaults to the HDR carrier.

Turning to FIG. 9, the "power ON" procedure for a mobile station that uses HDR as the default carrier is illustrated. Because this power ON procedure is substantially similar to the procedure described with respect to FIG. 2, only the differences are highlighted for ease in illustration. In particular, the only difference is at the final step 460, wherein the mobile station is resynchronized with the HDR carrier to make this the default carrier.

Because HDR is the default carrier in the idle state, the mobile station cannot directly receive or place voice calls. Note that if a user receives a voice call, data calls must use the lower data rate offered by the 1×RTT carrier. Thus, a useful feature is an "automatic switch." If the automatic switch is ON, a user directly receives an incoming voice call. If the automatic switch is OFF, the use is inquired whether the voice call should be connected. By setting the automatic switch to OFF, a user may opt to not receive the call to preserve the higher data rate offered by the HDR carrier.

Turning to FIG. 10, the call flow for receiving an incoming voice call, while the mobile station is in the idle state is illustrated. At step 470, the mobile switching center checks the Class of Service for whether the automatic switch is ON. If the automatic switch is ON, the mobile switching center instructs the mobile station to search for the 1×RTT carrier and synchronize with it. Upon finding the 1×RTT carrier, the MS informs the mobile switching center and switches to the 1×RTT carrier. On notification that the 1×RTT carrier is found, the mobile switching center sends the call to the mobile station. When the call is complete and the mobile switching center receives a RELEASE message, the mobile switching center instructs the mobile station to resynchronize with the HDR carrier.

If the automatic switch is OFF, the call flow proceeds at step 480. Here, the mobile switching center sends an SMS message to the user informing the user that an incoming call has been received. Should the user accept the call, the mobile switching center instructs the mobile station to search for the 1×RTT carrier. Upon finding the 1×RTT carrier and informing the mobile switching center, the mobile station switches to the 1×RTT carrier. The mobile switching center may then send the call to the MS. After the call is complete and the mobile switching center receives a RELEASE message, the mobile switching center instructs the mobile station to resynchronize with the HDR carrier. If the user does not accept the call, it is rejected at step 490.

The converse of the call flow of FIG. 10 is now discussed. In this situation, the user is in the idle state, defaulting to the HDR carrier, and wishes to place an outgoing voice call by pressing the SEND button. The mobile switching center then instructs the MS to search for the 1×RTT carrier. Upon finding the 1×RTT carrier and informing the mobile switching center, the mobile station switches to the 1×RTT carrier. The mobile switching center may then send the call to the PSTN or another mobile station, depending upon the call's destination. After the call is complete and the mobile switching center receives a RELEASE message, the mobile switching center instructs the mobile station to resynchronize with the HDR carrier.

Unlike a voice call, because the mobile station is defaulted to the HDR carrier, it may directly receive or place a high rate data call on the HDR carrier. The call flow for receiving an incoming data call while in the idle state is discussed first. In such a case, the Packet Data Server Node (PDSN) notifies the base station controller of the incoming data call. The base station controller will then notify the mobile switching center of the call via the A-interface.

After the mobile switching center checks the user's Class of Service, the mobile station may be connected to the Packet Data Core Network (PDCN) until the call is completed and the mobile station disconnects.

The call flow for placing an outgoing data call while in the idle state is similar. The mobile station initiates the data call so that the mobile station may be connected to the PDCN until the call is complete and the mobile station disconnects the data call.

Note that if a user wishes to place or receive a data call during an active voice call, the MS must already be on the 1×RTT carrier. Thus, call flows for placing and receiving data calls during an active voice call are as described with respect to FIGS. 5 and 6. Conversely, if the user wishes to receive or place a voice call during an active data call, the mobile station is synchronized with the HDR carrier. Thus, call flows for placing and receiving voice calls during an active high data rate call are as described with respect to FIGS. 7 and 8.

Note that in the embodiment of the invention just described, the mobile station defaults to the HDR carrier while in the idle state. However, it is possible that a given cell may only support 1×RTT. Thus, the invention also provides handoff procedures at the boundaries between hybrid and 1×RTT-only cells.

For example, a mobile station may be within a hybrid cell and travel to a cell supporting only 1×RTT. If the mobile station was idle, it must synchronize with and acquire the 1×RTT carrier as it travels into the 1×RTT cell. If, however, a high data rate call was active in the hybrid cell, the mobile station must synchronize with 1×RTT carrier and switch the data call over to the lower data rate 1×RTT carrier as the mobile station travels into the 1×RTT cell. Preferably, an SMS message would notify the user that the call is continuing at the lower data rate. Note that an active voice call could have been on hold with the active HDR call. In this case, the voice call would become active as the data call switched over to the low data rate 1×RTT carrier. Similarly, if a low data rate call (on the 1×RTT carrier) was active in the hybrid cell, the MS must still synchronize with the 1×RTT carrier in the 1×RTT cell. However, the data call would continue at the same data rate. If the 1×RTT carrier within the hybrid cell has an active voice call, the 1×RTT handoff procedures would be followed as the MS traveled into the 1×RTT cell, allowing the voice call to remain active.

Conversely, a mobile station could be within a 1×RTT cell and travel into a hybrid cell supporting both 1×RTT and HDR. If no calls were active, the MS need merely synchronize with the HDR carrier within the hybrid cell. If a data call was active in the 1×RTT cell, the data call may be switched to the higher data rate HDR carrier as the mobile station travels into the hybrid cell. Preferably, the user would be notified with an SMS message that the data call has been switched to the higher data rate. If either a voice call or a simultaneous voice and data call was active in the 1×RTT cell, the call could not be switched to the HDR carrier as the mobile station travels into the hybrid cell. Instead, standard 1×RTT hand off procedures would be followed.

3. Dynamic Selection of the Most Appropriate Carrier

In another aspect of the invention, methods are provided for detecting whether an application running over an data call requires a transfer from the best-efforts carrier (non-real time) to the all services carrier (real time). In one embodiment of the invention, the all-services carrier is a 1×RTT carrier and the best-efforts carrier is an HDR carrier. An example of such an application is a Voice over IP call. Two main embodiments are provided: a packet detection method and an Application Programming Interface method.

Figure 11:
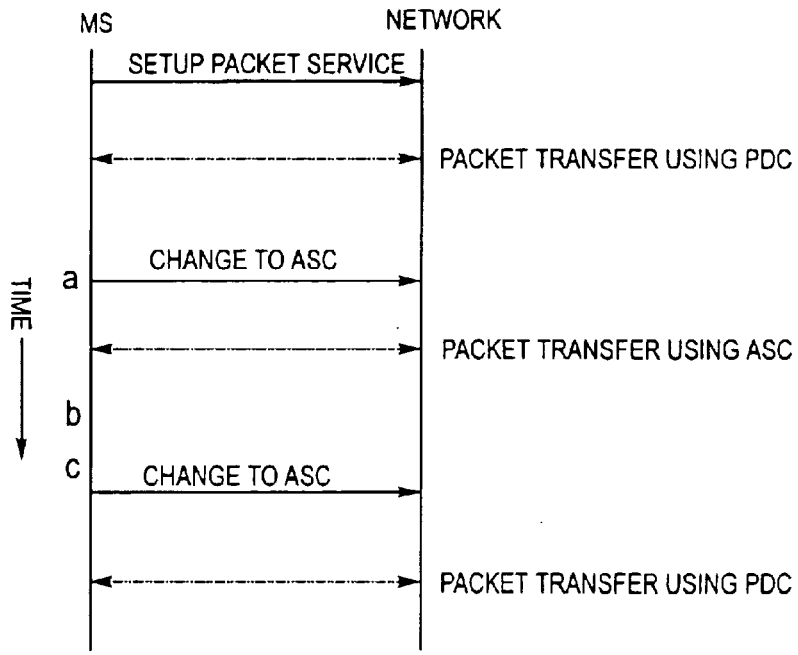
FIG. 11 is a time line for a packet detection method for dynamically selecting the most appropriate carrier in a hybrid network.

Turning now to FIG. 11, a timeline for the packet detection method is illustrated. Prior to time a, a high data rate call is active over the HDR carrier such that packet data is transferred between the mobile station and the network. Next, an application running over the call causes packets to be sent requiring the real time capabilities of the 1×RTT carrier (such as a Voice over IP call). Either the mobile station or other components in the network could detect this requirement by examining the transmitted packets by, for example, identifying the UDP port number. If the packets indicate that the 1×RTT carrier is required, the mobile station would synchronize to and transfer the call over to the 1×RTT as shown at time a. At time b, the application requiring the real time capabilities of the 1×RTT carrier would no longer do so (for example, a Voice over IP call may have terminated.) In one embodiment of the invention, the mobile station could set a timer after the last packet was transferred, which would typically be just before time b. When the timer expires at time c, if no other applications requiring real time service are running, the mobile station could synchronize to and transfer the data call over to the HDR carrier.

Figure 12:
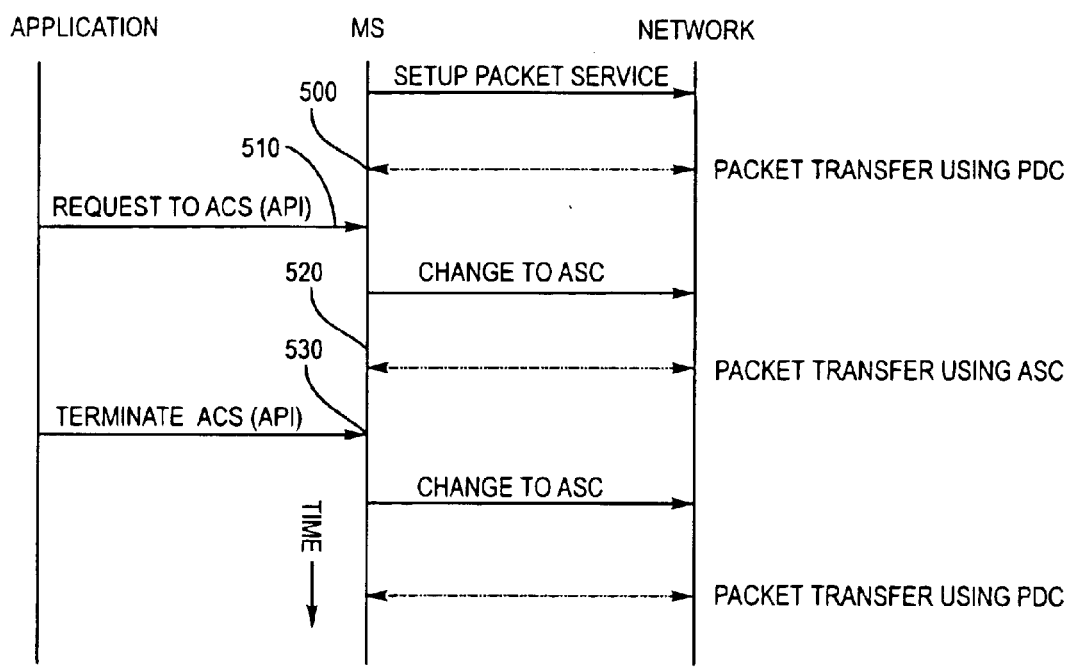
FIG. 12 is a time line for an Application Program Interface method for dynamically selecting the most appropriate carrier in a hybrid network.

Turning now to FIG. 12, a time line for the Application Programming Interface method is illustrated. Initially, at time 500, a high data rate call is also active over the HDR carrier. An application running on the mobile station would determine that the real-time capabilities of the 1×RTT carrier are required and would trigger an Application Programming Interface to request a transfer of the high data rate call to the 1×RTT carrier at time 510. The mobile station would then synchronize to, and transfer the call over to, the 1×RTT carrier as shown at time 520. When the application determines that the 1×RTT carrier is no longer required, the Application Programming Interface would then request a transfer back to the HDR carrier as shown at time 530. The mobile station would then synchronize to and transfer the data call over to the HDR carrier.

While the many aspects of the present invention are susceptible to various modifications and alternative forms, specific examples thereof have been shown by way of example in the drawings and are herein described in detail.

It should be understood, however, that the invention is not to be limited to the particular forms or methods disclosed, but to the contrary, the invention is to cover all modifications, equivalents, and alternatives falling within the scope of the appended claims.

What is claimed is:

1. A method of wireless communication, comprising:
   (a) synchronizing, during an idle state, a mobile station to a default carrier selected from a group comprising an all-services carrier and a best-efforts carrier, the all-services carrier supporting real-time and non-real-time services, the best-efforts carrier supporting only non-real-time services;
   (b) notifying the mobile station to synchronize with a remaining carrier;
   (c) synchronizing the mobile station to the remaining carrier;
   (d) connecting an incoming call to the mobile station over the remaining carrier; and
   (e) synchronizing the mobile station to the default carrier upon completion of the incoming call.

2. The method of claim 1, wherein the default carrier is a 1×RTT carrier, the remaining carrier is a HDR carrier, and the call is a data call.

3. The method of claim 1, wherein the default carrier is a HDR carrier, the remaining carrier is a 1×RTT carrier, and the call is a voice call.

4. The method of claim 1, wherein prior to notifying the mobile station to synchronize with the remaining carrier, the mobile station has an active voice call in progress over the default carrier, the active voice call being placed on hold during steps (c), (d) and (e), and further wherein the default carrier is a 1×RTT carrier.

5. The method of claim 1, wherein notifying the mobile station to synchronize with the remaining carrier includes notifying the mobile station to synchronize with a HDR carrier because of the incoming call, said incoming call being a data call, and further comprising:
   placing an active voice call over the default carrier on hold;
   accepting the data call over the HDR carrier; and
   reconnecting the active voice call.

6. A wireless communication network configured to allow a call to be selectively carried over either an all-services carrier or a best-efforts carrier, the all-services carrier supporting real-time and non-real-time services, the best-efforts carrier supporting only non-real-time services, said wireless communication network further being configured to:
   connect a data call to a mobile station over the best-efforts carrier;
   if a specified condition is detected while the data call is in progress,
   synchronize the mobile station to the all-services carrier; and
   continue the data call over the all-services carrier.

7. The communication network of claim 6, wherein the all-services carrier is a 1×RTT carrier, and the best-efforts carrier is a HDR carrier.

8. The communication network of claim 6, wherein the best-efforts carrier is a packet data carrier.

9. The communication network of claim 6, wherein the specified condition is detected by examining transmitted packet data.

10. The communication network of claim 6, wherein the specified condition is detected by an Application Programming Interface within the mobile station.

11. A wireless communication network configured to allow a call to be selectively carried over either an all-services carrier or a best-efforts carrier, the all-services carrier supporting real-time and non-real-time services, the best-efforts carrier supporting only non-real-time services, the network further configured to:
   synchronize, during an idle state, a mobile station to a default carrier comprising either the all-services carrier or the best-efforts carrier;
   notify the mobile station to synchronize with a remaining carrier upon notice of an incoming call at a mobile station controller;
   synchronize the mobile station to the remaining carrier upon receipt of the incoming call;
   connect the incoming call to the mobile station over the remaining carrier; and
   synchronize the mobile station to the default carrier upon completion of the call.

12. The communication network of claim 11, wherein the default carrier is a 1×RTT carrier, the remaining carrier is a HDR carrier, and the call is a data call.

13. The communication network of claim 11, wherein the default carrier is a HDR carrier, the remaining carrier is a 1×RTT carrier, and the call is a voice call.

14. The communication network of claim 11, wherein prior to notifying the mobile station to synchronize with the remaining carrier, the mobile station has an active voice call in progress over the default carrier, and the network is configured to place the active voice call on hold while the mobile station is synchronized to the remaining carrier.

15. The communication network of claim 14, wherein the default carrier is a 1×RTT carrier, the remaining carrier is a HDR carrier, and the call is a data call.

16. The communication network of claim 11, wherein the network is further configured to:
   transfer the incoming voice call to the remaining carrier; wherein the incoming call is a voice call; and
   accept the voice call over the remaining carrier.

17. The communication network of claim 11, wherein the network is further configured to:
   place an active voice call over default carrier on hold;
   accept the incoming call over the remaining carrier, wherein the incoming call is a data call; and
   reconnecting the active voice call.

18. A method of wireless communication, comprising:
   providing a hybrid network, the hybrid network enabling a call to be selectively carried over either a 1×RTT carrier or an HDR carrier;
   connecting a data call over the HDR carrier;
   determining that the data call should be carried over the 1×RTT carrier;
   synchronizing the mobile station to the 1×RTT carrier; and
   continuing the data call over the 1×RTT carrier.

19. The method of claim 18, wherein the determining step comprises examining transmitted packet data.

20. The method of claim 18, wherein the determining step is performed by an Application Programming Interface within the mobile station.

* * * * *